Aug. 10, 1965 M. FOUNTAIN-BARBER 3,199,533
FLUID-PRESSURE RELIEF VALVE
Filed June 26, 1963

INVENTOR.
MARTIN FOUNTAIN-BARBER
BY
Reynolds & Christensen
ATTORNEY

United States Patent Office 3,199,533
Patented Aug. 10, 1965

3,199,533
FLUID-PRESSURE RELIEF VALVE
Martin Fountain-Barber, Cheltenham, England, assignor to Dowty Mining Equipment Limited, Ashchurch, near Tewkesbury, England, a British company
Filed June 26, 1963, Ser. No. 290,662
Claims priority, application Great Britain, June 29, 1962, 25,093/62
6 Claims. (Cl. 137—543.13)

This invention relates to fluid flow from control valves, for example, fluid-pressure valves.

The present invention provides a fluid-pressure relief valve including a valve seat having a passage through which fluid passes when the valve is open, a valve member of rubber or other suitable resilient non-metallic material, a spring urging the valve member and valve seat together normally to prevent flow of fluid through the passage, and an anti-extrusion member carried by the valve member to resist extrusion of the valve member into the passage in the valve seat.

The present invention also provides a fluid-flow control valve including a valve seat having a passage through which fluid passes when the valve is open, a valve member of rubber or other suitable resilient non-metallic material, means urging the valve seat and valve member together normally to close the valve, and an anti-extrusion member carried by the valve member to resist extrusion of the valve member into the passage in the valve seat. The anti-extrusion member may completely cover the passage in the valve seat when the valve is closed.

The anti-extrusion member may be metallic or may be formed of a suitable non-metallic material different from the material of the valve member.

The valve member may be located in a recess in a valve member carrier, the inner portion of the recess being larger in cross-section than the outer portion of the recess and the initial cross-sectional outer dimensions of the valve member being such that the valve member is initially a close fit in the outer portion of the recess, the difference in cross-sectional area between the inner and outer portions of the recess being sufficient to accommodate a permanent set of the valve member caused by the pressure exerted on the valve member by the valve seat. The accommodation of a permanent set of the valve member in the inner portion of the recess, also assists in retaining the valve member in the recess.

The anti-extrusion member may have an extension which extends into the passage of the valve seat and makes a sliding fit with the wall of the passage. The extension ensures that the valve member and valve seat are aligned with each other during and after assembly of the valve.

If the passage in the valve seat is circular in cross-section, the extension may have a substantially square cross-section with rounded corners which make a sliding fit with the wall of the passage. When the valve is open, fluid passes between the sides of the extension and the wall of the passage. Alternatively, the major part of the surface of the extension may be arcuate and make a sliding fit with the wall of the passage, the remaining part of the surface forming at least one channel through which fluid passes when the valve is open. If more than one channel is formed, these may be arranged symmetrically.

One embodiment of the present invention will now be described, by way of example, with reference to the accompanying drawing of which, FIG. 1 is a cross-sectional view of a liquid-pressure relief valve, FIG. 2 is a cross-sectional view on an enlarged scale of the cooperating valve members in FIG. 1;

Figure 1:
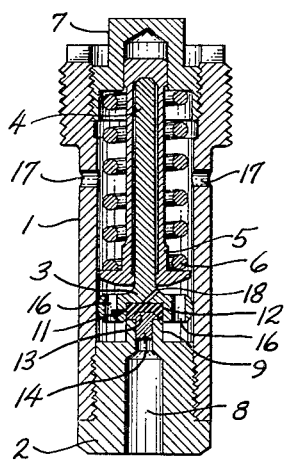
Figure 2:
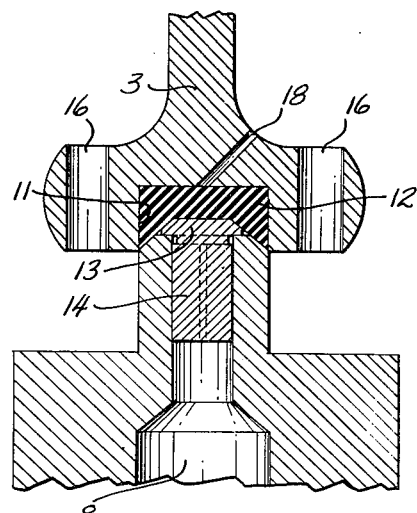
Figure 3:
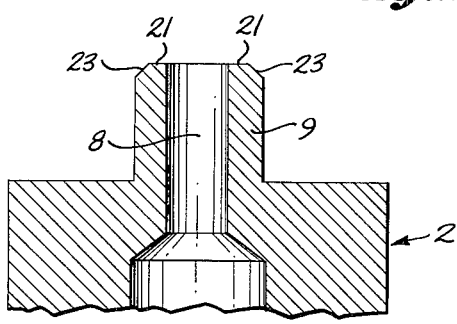
FIG. 3 is a cross-sectional view of the valve seat alone in FIG. 2.
Figure 4:
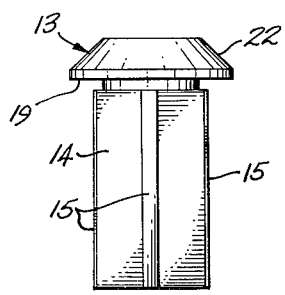
FIG. 4 is a side view on an enlarged scale of the anti-extrusion member of the valve and, FIG. 5 is an underneath view of the anti-extrusion member.
Figure 5:
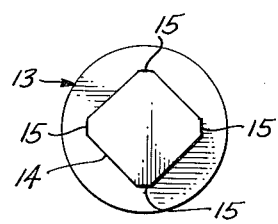

With reference to the accompanying drawing, a liquid-pressure relief valve suitable for use in a pit-prop includes a housing 1 into which is screwed a tubular valve seat 2. A valve member carrier 3 is slidable within the housing 1 and has a rearwardly projecting spindle 4 over which is fitted a guide 5 for a spring 6. The spring 6 acts between an adjustable stop 7 and the guide 5 to urge the valve member carrier 3 towards the valve seat 2.

The valve seat 2 has a passage 8 extending from one end to the other. One end portion of the valve seat 2 is in the form of a projection 9 from the main body of the valve seat 2 and the outer dimensions of the projection 9 are such that it makes a sliding fit with the wall of a recess 11 in the valve member carrier 3.

The recess 11 in the carrier 3 contains a cup-shaped rubber valve member or plug 12 which carries a frusto-conical metal anti-extrusion member 13. The anti-extrusion member 13 is bonded to the valve member 12 and, when its face 19 is engaging the end face 21 of the projection 9 of the valve seat 2, it completely covers the passage 8. The anti-extrusion member 13 has an extension 14 on its face 19 which extends into the passage 8 and makes a sliding fit with the wall of the passage 8. The extension 14 has a substantially square cross-section with rounded corners 15 which make a sliding fit with the wall of the passage 8.

The frusto-conical head of the anti-extrusion member 13 is located in the cupped recess of the valve member 12 which tapers from its rim towards the bottom of the recess. The head of the anti-extrusion member 13 tapers correspondingly so as to fit into the recess. The end portion of the projection 9 of the valve seat 2 also tapers towards its end face 21 in such a manner that, when the cover face 19 of the anti-extrusion member 13 is engaging the end face 21 of the projection 9, the tapering surfaces 23 and 22, respectively, of the projection 9 and the anti-extrusion member 13 form a smooth continuous surface engaged by the valve member 12.

The valve member carrier 3 has a number of passages 16 through which liquid leaving the valve seat 2 can flow to exit passages 17 in the housing 1. The valve member carrier 3 also has a passage 18 through which any liquid behind the valve member 12 can leak away.

The cross-section of the valve member 12 is such that the valve member 12 is initially a close fit in the recess 11, the cross-section of the recess 11 being sufficient to accommodate a permanent set of the valve member 12 caused by the pressure exerted on the valve member 12 by the projection 9 of the valve seat 2. The accommodation of a permanent set of the valve member 12 in the recess 11 also assists in retaining the valve member 12 in the recess 11.

In use, the passage 8 is in communication with a chamber (not shown in the drawing) containing liquid under pressure. The liquid fills the passage 8 and passes between the sides of the extension 14 of the anti-extrusion member 13 and the wall of the passage 8 so that the liquid pressure acts on the anti-extrusion member 13 and tends to force the valve member carrier 3 away from the valve seat 2 against the force exerted by the spring 6.

So long as the liquid pressure remains below a certain predetermined value, determined by the force exerted by the spring 6 on the valve member carrier 3, the force exerted by the spring 6 on the valve member carrier 3 is greater than the force exerted by the liquid on the anti-extrusion member 13 and consequently the anti-extrusion member 13 and valve member 12 are forced against the end face 21 of the projection 9 of the valve member 2. Thus the valve is in the closed condition and liquid cannot escape from the passage 8.

If the liquid pressure rises above the predetermined value, the force exerted by the liquid on the anti-extrusion member 13 overcomes the force exerted by the spring 6 on the valve member carrier 3 so that the valve member carrier 3 is moved against the force of the spring 6, and the anti-extrusion member 13 and valve member 12 become separated from the end face 21 of the projection 9, hence opening the valve. Liquid then escapes from the passage 8 in the valve seat 2 against the face 19 of the anti-extrusion member 13, thence between surfaces 22 and 23, and finally outwardly through the passages 16 and the exit passages 17 in the housing 1.

As liquid escapes through the valve, the liquid pressure is relieved until the force exerted by the spring 6 on the valve carrier 3 overcomes the force exerted by the liquid and reseats the valve member 12 and anti-extrusion member 13 on the end face 21 of the projection 9, hence closing the valve. The extension 14 of the anti-extrusion member 13 remains in the passage 8 when the valve opens and ensures that the valve member 12 is always aligned with the projection 9 of the valve seat 2.

When the valve is in the closed condition, the anti-extrusion member 13 resists the extrusion of the valve member 12 into the passage 8. Extrusion of the valve member 12 between the valve member carrier 3 and the outer surface of the projection 9 of the valve seat 2 is resisted by making the projection 9 a close fit in the recess 11 in the valve member carrier 3.

I claim:

1. A fluid-pressure relief valve including a valve member carrier having a recess, a valve member of resilient non-metallic material located in the recess, a valve seat having a passage through which fluid passes when the valve is open, said passage extending to an opening at one end of the valve seat, the valve seat having an end portion at said one end which is a sliding fit in the recess in the valve member carrier, an anti-extrusion member covering the opening in said end of the valve seat to resist extrusion of the valve member into the passage, and resilient means urging the valve member carrier and valve seat towards one another to urge the valve member and the anti-extrusion member against said end of the valve seat, said one end of the valve seat having a surface surrounding the opening, said surface being substantially co-planar with said opening, and the anti-extrusion member having a surface engaging said surface of the valve seat.

2. A fluid-pressure relief valve according to claim 1 wherein the anti-extrusion member and the end portion of the valve seat have substantially frusto-conical cross-sections, and the sloping surface of the frusto-conical section of the valve seat and the sloping surface of the frusto-conical section of the anti-extrusion member form a substantially continuous surface.

3. In a pressure relief valve for a pressurized fluid, a pair of relatively movable valve members which have mutually aligned end portions that are relatively biased toward one another so that the end faces thereof assume a normally closed condition, the end face of one member having an opening in the center portion thereof which provides an escape passage for the fluid when the valve is opened, and the end face of the other member having a recess therein in which there is engaged a cup-shaped resilient non-metallic plug the rim of which is disposed so that it faces outwardly of the recess in the direction of the one member's end face, said one member having its end portion slidably engaged in the recess so that the peripheral portion of its end face is abutted into sealing contact with the rim of the plug, and said center portion of the one member's end face having a planar annulus thereon which is disposed around the edge of its opening so as to form a substantially right angular section with the terminal wall of the same, and there being an anti-extrusion member which is located between and engages the plug and the one member with one face thereof covering the mouth of the opening so as to prevent the plug from extruding into the same in said closed condition said face of the anti-extrusion member having a planar annulus thereon which is disposed around the edge of the opening opposite the annulus on the one member so that all of the fluid escaping from the opening impinges on the face of the anti-extrusion member before it can escape between the rim of the plug and the peripheral portion of the one member's end face.

4. A pressure relief valve according to claim 3 wherein the face of the anti-extrusion member has a projection thereon which is slidably engaged in the opening and surrounded at its base by the extrusion member's annulus.

5. A pressure relief valve according to claim 3 wherein the rim of the plug and the peripheral portion of the one member's face have corresponding frusto-conical surfaces inclined to the extrusion member's annulus.

6. A pressure relief valve according to claim 5 wherein the anti-extrusion member has a frusto-conical head which is engaged in the plug so that the frusto-conical surfaces of the head, the rim of the plug, and the peripheral portion of the one member's face are all in substantially continuous alignment with one another.

References Cited by the Examiner

UNITED STATES PATENTS

| 345,156 | 7/86 | Little | 137—533.31 XR |
| 2,124,155 | 7/38 | Thaete | 251—332 |
| 2,976,883 | 3/61 | Frye | 137—543.13 XR |

ISADOR WEIL, *Primary Examiner.*